HIGH SPEED ELECTRO-OPTIC PRINTER OR DISPLAY

Original Filed Oct. 21, 1963 4 Sheets-Sheet 1

INVENTOR
THOMAS J. HARRIS
BY Ralph C. Dustin
ATTORNEY

HIGH SPEED ELECTRO-OPTIC PRINTER OR DISPLAY

Original Filed Oct. 21, 1963 4 Sheets-Sheet 2

HIGH SPEED ELECTRO-OPTIC PRINTER OR DISPLAY

Original Filed Oct. 21, 1963 4 Sheets-Sheet 3

HIGH SPEED ELECTRO-OPTIC PRINTER OR DISPLAY

Original Filed Oct. 21, 1963 4 Sheets-Sheet 4

United States Patent Office

Re. 26,170
Reissued Mar. 7, 1967

26,170
HIGH SPEED ELECTRO-OPTIC PRINTER OR DISPLAY

Thomas J. Harris, Poughkeepsie, N.Y., assignor to International Business Machines Corporation, New York, N.Y., a corporation of New York Original No. 3,220,013, dated Nov. 23, 1965, Ser. No. 317,754, Oct. 21, 1963. Application for reissue Feb. 25, 1966, Ser. No. 536,173
15 Claims. (Cl. 346—107)

Matter enclosed in heavy brackets [ ] appears in the original patent but forms no part of this reissue specification; matter printed in italics indicates the additions made by reissue.

This invention relates to *display and* printing mechanisms, and more particularly to mechanisms employing a light beam and devices for controlling it to effect the *display or* printing of information at high speeds.

There is shown in a patent by Harold Fleisher et al., No. 3,182,574, issued May 11, 1965, an apparatus which displays characters selectively on a display medium by means of light. A character matrix is arranged in the path of a beam of light which is collimated and polarized, and the dimensions are such that each character in the matrix has a portion of the light directed upon it. The character mask is generally opaque but has transparent portions in the form of characters. Directly in back of each character is an electro-optic element engaged by electrodes which may be selectively energized to effect a rotation in the plane of polarization of the light passing through it. An analyzer associated with the matrix passes only the rotated portion of the light beam, and this portion is in the shape of the character through which the light passes. Means are then provided for deflecting the passed light to a selected location on the display medium. It will be appreciated that the deflection required will vary not only with the location selected but also with the location of the character in the matrix.

By providing a light beam which is large enough to encompass only a single character in a matrix and deflecting this beam to characters selectively, then there is no need for means to control the flow of light through the matrix. The intensity of the light passing through any character portion will be much greater than it would in the above-mentioned application if the same light source is used. By deflecting the light passing through any character portion to a common point, then it is possible to deflect it again from this point to any selected location on a display or light sensitive medium. There is no need, with this arrangement, to provide intricate controls which correct for the position of the character in the matrix as well as to locate the character in the desired position on the medium.

An object of this invention is to provide an improved *display or* printing mechanism.

Another object is to provide an improved mechanism in which a collimated, polarized, monochromatic light beam is directed selectively through characters of a matrix and then is deflected to a common point from which it is again deflected to a selected point on a light sensitive medium *or display medium.*

Yet another object is to provide an improved mechanism for producing a light beam of any desired configuration in cross section, and having means associated therewith for directing said beam to means for conveying information.

Still another object is to provide an improved mechanism which operates in the megacycle region to direct a light beam in any character shape to selected locations on a light sensitive medium for effecting printing, the speed being limited only by the sensitivity of the medium.

Another object is to provide a printing mechanism employing a light sensitive medium to which a light beam is directed over different paths by means of electro-optic devices, and having no moving mechanical parts.

The foregoing and other objects, features and advantages of the present invention will be apparent from the following more particular description of the preferred embodiments of the invention as illustrated in the accompanying drawings.

Figure 1:
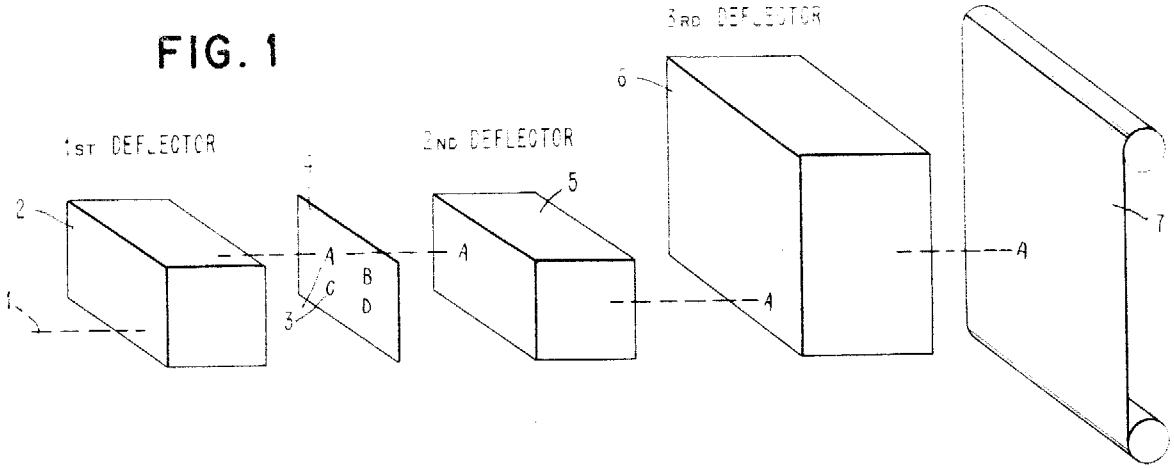
FIG. 1 is a schematic drawing of a mechanism by which a light beam is deflected to a selected character on a mask and then is returned in the character shape to a predetermined point from which it is again deflected to a selected location on a display or light sensitive medium.

Referring to the drawings, and more particularly to FIG. 1, it will be noted that there is shown an improved display or printing mechanism to which a beam 1 of monochromatic, collimated, and linearly polarized light is supplied from any suitable source, not shown. This light beam which is of small cross-sectional area may be supplied by a laser but could also be supplied by carbon or mercury arc lamps with appropriate filters, polarizers, and collimating means. The light beam 1 passes through a first deflector 2 which is operable to deflect the beam to a point in alignment with any character 3 on a character mask 4. This mask is generally opaque but its character portions are transparent so the beam may pass through such portion and assume the shape of the character. The character-shaped beam then passes through a second deflector 5 which is similar to the first deflector but neutralizes the deflection induced by the latter so the beam is returned to a path corresponding to that at which it was first received. At third deflector 6 receives the light beam from the second deflector and directs it to any selected point on the surface of a display or light sensitive member 7.

Figure 2:
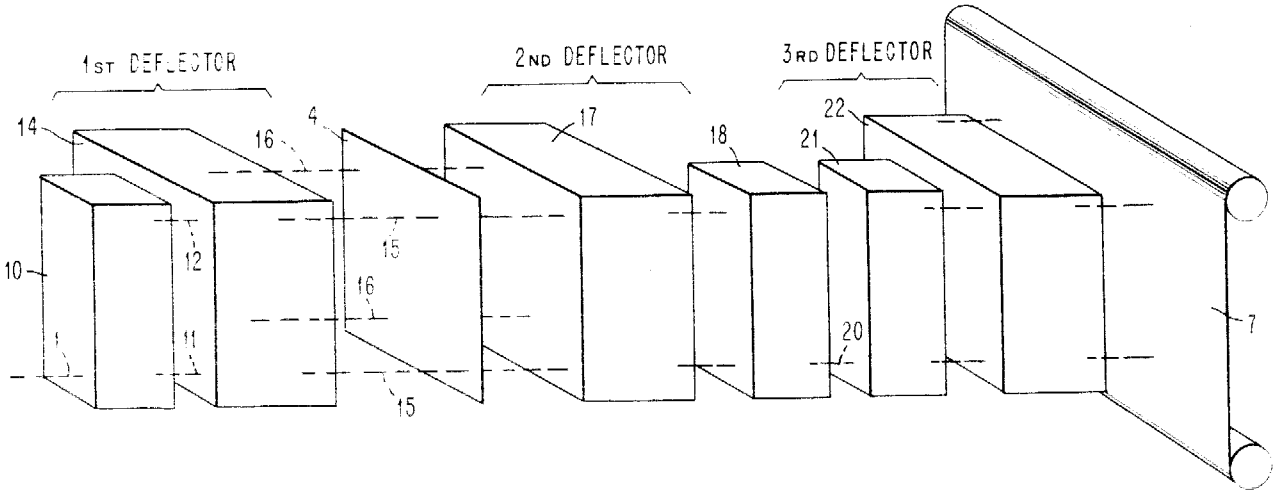
FIG. 2 is similar to FIG. 1 but shows three deflectors through which the light passes, each deflector having both means for deflecting the beam vertically to any one of a plurality of selected points, and means for deflecting it horizontally to any selected point.

As shown in FIG. 2, the first deflector comprises a unit 10 which operates to deflect the light beam 1 vertically to any one of several levels between the level 11 at which the beam is received and higher level 12. It also includes a unit 14 which is operable either to pass a light beam from unit 10 without deflection or to deflect the beam horizontally to any one of several paths between zero-deflection paths 15 and maximum deflection paths 16. It will be seen that the number of paths over which the light beam may be directed to the mask 4 is equal to the product of the beam levels produced by unit 10 and the horizontal deflections produced by unit 14. The second deflector is like the first except that it is inverted so the character-shaped light beams from the mask 4 first pass through a horizontal deflection unit 17 and then a vertical deflection unit 18. Unit 17 returns the light beam to the vertical plane in which the beam 1 was received, and the unit 18 returns any beam in this vertical plane to path 20 in line with the beam 1. The third deflector is like the first deflector, including a unit 21 for deflecting the light beam received from point 20, vertically to any one of several levels, and a unit 22 for deflecting a beam received at any one of these levels, horizontally any desired number of unit distances. The beam leaving the unit 22 engages the medium 7 on which information is displayed or printed.

Figure 3:
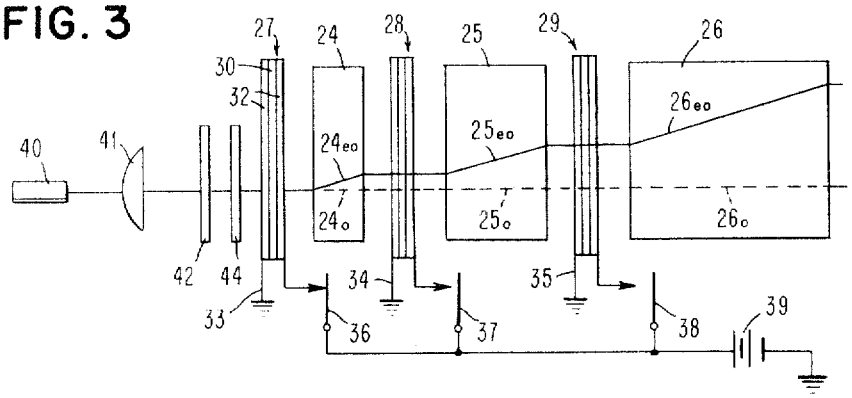
FIG. 3 is a side elevational view of the vertical deflection mechanism for the first deflector in FIG. 2 and the mechanism for delivering the light beam thereto.

The vertical deflection unit 10 comprises, as shown in FIG. 3, birefringent elements 24, 25 and 26 which may be crystals cut especially to allow incoming plane polarized *light* to pass through them in one path or another as either an ordinary ray or an extraordinary ray but not both simultaneously. The path followed depends upon the direction in which the beam entering the crystal is polarized. A beam plane polarized perpendicular to the plane of the drawing will pass, for example, through the crystal without deflection as the ordinary ray. If the light is polarized parallel to the plane of the drawing, it will be deflected and pass as the extraordinary ray over a different path. The spacing between the points at which the ordinary and extraordinary rays leave the crystal is directly proportional to the thickness of the crystal.

At the input sides of the birefringent elements 24, 25 and 26 are electro-optic devices 27, 28 and 29. Each of these devices is madeup of an electro-optic crystal 30 between a pair of transparent electrodes 32. When a potential of sufficient magnitude is applied across any one of the electro-optic devices, a rotation of the plane of polarization of the light by 90 degrees takes place. For applying such a potential selectively across these devices, one electrode of each device is connected to ground at points 33, 34 and 35 while the other electrodes are connected through switches 36, 37 and 38 to one side of a potential source 39 which is connected at its other side to ground. Mechanical switches are shown herein only to provide an understanding of the invention. In actual practice, electronic switching means responsive to coded electric pulses would be used. The potential at source 39 is of sufficient magnitude to effect a rotation of the plane of polarization of the light beam by 90 degrees as it passes through one of the electro-optic devices having a potential applied across it by the closing of one of the switches.

The light beam 1 is supplied from a suitable source 40 through a lens 41 which causes it to be collimated. The collimated light then passes through a polarizing means 42 which effects a linear polarization of the beam in a plane perpendicular to the plane of the drawing. A portion of the monochromatic, collimated and linearly polarized beam is passed through a small opening in a plate 44 to the electro-optic device 27. If all of the switches 36, 37 and 38 were open, the light beam would pass through each of the birefringent elements 24, 25 and 26 without deflection as the ordinary ray 24o, 25o, and 26o. Maximum deflection is obtained when the switch 36 is closed to apply a potential across the electro-optic device 27 and the other switches are left open, as shown in FIG. 3. The light beam has its plane of polarization rotated 90 degrees by the device 27 and passes through the elements 24, 25 and 26 as the extraordinary ray along the paths 24eo, 25eo and 26eo. If the switch 37 had also been closed, the plane of polarization would have been rotated again 90 degrees by the electro-optic device 28 to pass the ordinary ray through the elements 25 and 26 without deflection. The total displacement would then have been only that which took place in element 24. By closing the switches either singly or in combination it is possible to obtain deflections proportional to the thickness of any element or combination of elements. As shown in FIG. 3, the thickness of the elements 24, 25 and 26 increases by a factor of two. With this arrangement, the number of levels at which an output of light may be obtained is equal to two raised to a power equal to the number of elements. Since three elements have been shown, an output could be obtained at any one of eight levels.

Figure 4:
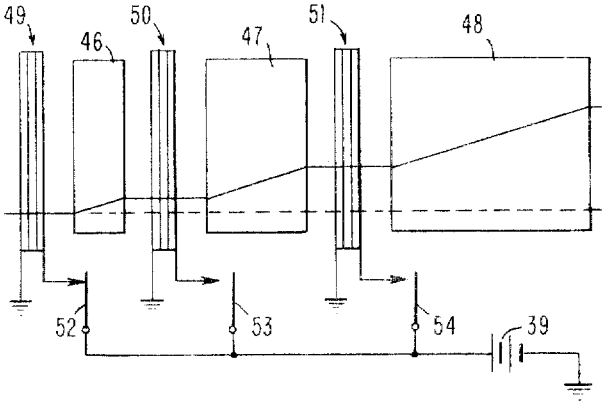
FIG. 4 is a plan view of the horizontal deflection mechanism for the first deflector of FIG. 2.

The horizontal deflection unit 14 of the first deflector is shown in plan view in FIG. 4 so the different paths that the light may follow through this unit can be indicated. This unit includes birefringent elements 46, 47 and 48 like those in the vertical deflection unit but rotated 90 degrees so the extraordinary rays are deflected inwardly as viewed in FIG. 2, while the ordinary rays continue to move in planes parallel to the plane of the drawing. At the input sides of the elements 46, 47 and 48 are electro-optic devices 49, 50 and 51 like the devices 27, 28 and 29 and adapted to have potentials applied across them by the closing of switches 52, 53 and 54. Since the birefringent elements 46, 47 and 48 are turned 90 degrees relative to the elements 24, 25 and 26, light polarized in a plane to pass through the latter elements as an ordinary ray will pass through the elements 46, 47 and 48 as an extraordinary ray. Also light passing through the elements 24, 25 and 26 as the extraordinary ray will pass through the elements 46, 47 and 48 as the ordinary ray. Light deflected to its maximum vertical position in FIG. 3 by passing it through each of the elements as the extraordinary ray will pass through the elements 46, 47 and 48 without deflection if all of the switches 52, 53 and 54 are open. To obtain maximum horizontal deflection of this light in FIG. 4, switch 52 must be closed while switches 53 and 54 are left open. With the deflection units 10 and 14 of FIG. 2 constructed as shown in FIGS. 3 and 4, an output of light could be obtained from the unit 14 in any one of eight equally spaced vertical planes and at any one of eight points spaced vertically equal distances in each plane. There are, therefore, sixty-four different points through which light may be directed to the character mask 4. This number could be increased, if desired, by simply adding another birefringent element and electro-optic device to either one or both of the units 10 and 14.

Figure 5:
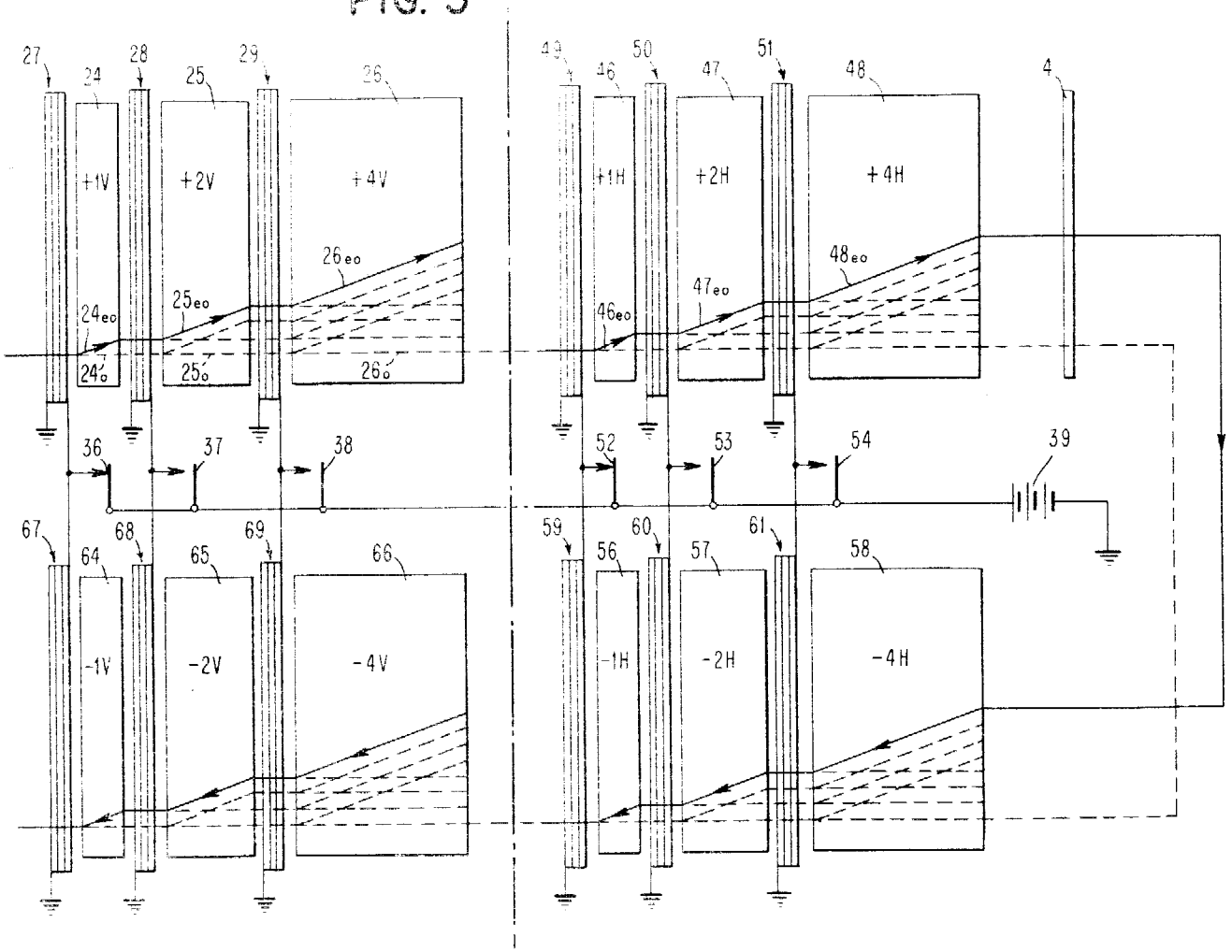
FIG. 5 is a schematic view of a mechanism for deflecting a light beam to any selected point on a character mask and then returning the beam to a point corresponding to that at which the beam entered the deflector.

The horizontal deflection of unit 17 (FIG. 2) of the second deflector is shown in FIG. 5 comprising birefringent elements 56, 57 and 58 corresponding to the elements 46, 47 and 48 in the unit 14 but having the light beam directed through them in the reverse order. These elements are inverted relative to the elements 46, 47 and 48 so that light passing through the latter as extraordinary rays also passes through elements 56, 57 and 57 as extraordinary rays but are deflected in the opposite direction. Associated with the elements 56, 57 and 58 are electro-optic devices 59, 60 and 61 located at the output sides of the elements. A light beam polarized in a plane to pass as the extraordinary ray through the birefringent elements will be deflected by the elements 56, 57 and 58 amounts equal to the deflections by elements 46, 47 and 48 but in opposite directions. Where the horizontal deflections of the extraordinary rays have been indicated at +1H, +2H, and +4H for the elements 46, 47 and 48, they have been indicated as −1H, −2H and −4H for the elements 56, 57 and 58. The electro-optic devices 59, 60 and 61 are grounded at one side and are connected at their opposite sides to the corresponding sides of the electro-optic devices 49, 50 and 51 which are connected through the switches 52, 53 and 54 to the potential source 39.

Vertical deflection unit 18 (FIG. 2) is shown in FIG. 5 as made up of birefringent elements 64, 65 and 66 corresponding to elements 24, 25 and 26 but having light directed through them in the reverse order and acting to deflect the extraordinary rays equal amounts in the opposite direction. At the output sides of these elements are electro-optic devices 67, 68 and 69 grounded at one side and connected at their opposite sides of the electro-optic devices 27, 28 and 29. They are also adapted to be connected through the switches 36, 37 and 38 to the potential source 39.

If only the switch 52 is closed in FIG. 5, the light beam passes as the ordinary ray through each of the birefringent elements, taking the shape of the character at the lower right hand corner of the mask 4 and leaving the electro-optic device 67 polarized in the same plane it was received by the electro-optic device 27. It will be understood that light polarized in a direction to pass straight through the vertical deflecting elements must have its direction of polarization rotated 90 degrees by the electro-optic device 49 in order to pass straight through the horizontal deflecting elements 46, 47 and 48. This light also passes through the elements 58, 57 and 56 without deflection but then must have its direction of polarization rotated 90 degrees by the device 59 in order to pass through the elements 66, 65 and 64 without deflection. The closing of the switch 52 causes both devices 49 and 59 to rotate the plane of polarization by 90 degrees. Assuming that the switches 36 and 52 are closed as shown, the plane of polarization is rotated 90 degrees by the device 27 and the beam passes as the extraordinary ray through each of the birefringent devices 24, 25 and 26 so it is deflected to the uppermost level. The device 49 then causes the plane of polarization to be rotated 90 degrees so the light is deflected by the elements 46, 47 and 48 over the path of the solid line in FIG. 5 to the character at the upper left hand corner of the mask 4. Light in this character shape then passes through the elements 58, 57 and 56 as an extraordinary ray and is deflected forwardly on the uppermost level. Electro-optic device 59 then rotates the plane of polarization 90 degrees so the light passes through the elements 66, 65 and 64 as an extraordinary ray and is deflected downwardly to the same level at which it entered the electro-optic device 27. Since the switch 36 is closed, the electro-optic device 67 acts to rotate the plane of polarization to that in which the light beam was delivered to the device 27. If switches 36 and 37 had both been closed, the plane of polarization would have been rotated by the device 27 so the light followed the path 24eo in the element 24 but then was rotated by the device 28 to follow the ordinary path until the horizontal deflecting elements were reached. These would cause a deflection of the light over the path of the solid line in FIG. 5 but at a level of only one unit space above the lower-most level. The light would then follow the ordinary path through the birefringent elements 66 and 65 until the device 68 was reached. It would be rotated again by the device 68 to follow the extraordinary path through the element 64 and then be rotated once more by the device 67 so the plane of polarization was again the same as that at which it entered the device 27. This operation would have selected the character spaced vertically one unit from the character at the lower left hand corner of the mask 4. By closing the switches either singly or in combinations, the light beam can be directed through any one of sixty-four characters in the mask and in each case be returned to a path corresponding to that at which it was first received and having the same plane of polarization.

After the light beam leaves the electro-optic device 67, it passes through the vertical deflection unit 21 and the horizontal deflection unit 22 to the *display or* light sensitive medium 7 in FIG. 2. The units 21 and 22 are like the units 10 and 14 except that each may have more than the three birefrigerant elements and electro-optic devices shown for the units 10 and 14 in FIGS. 3 and 4. The number provided will depend on the number of points at which it is desired to print characters both horizontally and vertically. If desired, only a horizontal deflection unit may be employed in place of the units 21 and 22 so the characters are printed on a single line. A mechanism would then be provided for advancing the medium 7 line by line as printing progressed.

Figure 6:
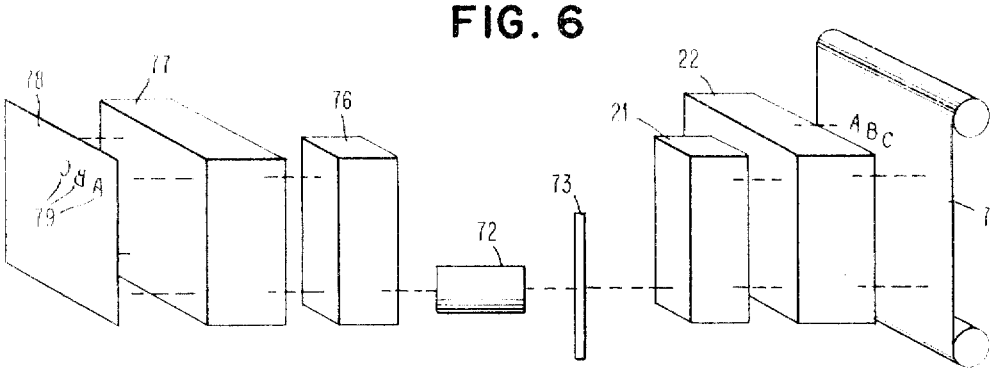
FIG. 6 shows another form of the improved printing mechanism in which a laser operates to produce a light beam in the shape of selected characters.

There is shown in FIG. 6 another mechanism by which a light beam is produced during a lasing action in the shape of any desired character and then is delivered through the vertical deflection unit 21 and the horizontal deflection unit 22 to the *display or* light sensitive medium 7. It is common practice in the use of lasers to establish lasing action by reflecting light through a negative temperature medium 72 from mirrors arranged at its ends. One of the mirrors fully reflects the light while the other reflects part of the light and permits the remainder to pass through. As shown in FIG. 6, a partially reflecting mirror 73 is arranged at one end of the medium 72 to pass collimated and plane polarized light from the laser optical cavity to the vertical deflection unit 21. At the other end of the medium 72 and arranged within the optical cavity is a vertical deflection unit 76 and a horizontal deflection unit 77, each being made up of birefringent elements and electro-optic devices as in FIGS. 3 and 4 but having the electro-optic devices on the sides of the birefringent elements adjacent the medium 72. At the left side of the unit 77 is a screen 78 having mirror characters 79 at points lying in paths through which light may be directed by the unit 76 and 77. Each of the characters is made of a material which reflects all of the light back through the units 77 and 76 in the character shape. Thus lasing action is established in the optical cavity formed by the partially reflecting mirror 73 and one of the selected character mirrors 79. It will be appreciated that any electro-optic device acting on the light beam to change its path of travel toward the screen 78 will again act on the light as it travels in the opposite direction and neutralize any deflecting effect. By operating in this manner, only one set of deflecting units is needed to produce a light beam in the shape of any desired character and deliver it over a fixed path to other units which direct it to selected points on the medium 7.

Figure 7:
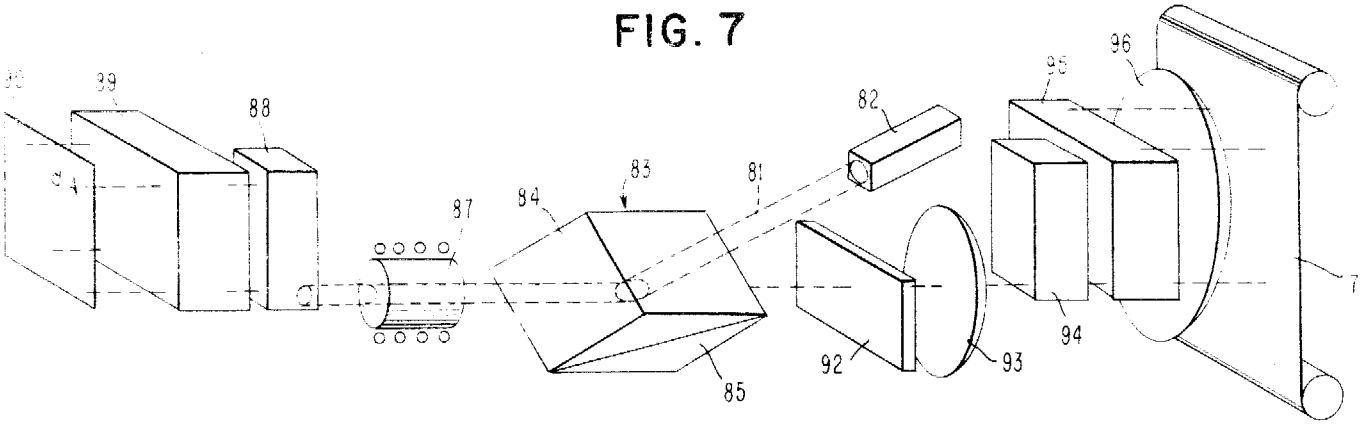
FIG. 7 shows a system similar to FIG. 6 but employing a beam splitter and light rotators for controlling the flow of light.

FIG. 7 shows another form of the invention in which a beam 81 of plane polarized light is supplied from a suitable source 82 to a beam splitter 83 consisting of a pair of sodium nitrate prisms 84 and 85 arranged face to face and at an angle of 45 degrees to the plane of the paper. The light beam 81 is polarized in such a plane that it is reflected at the adjacent faces of the prisms to the left, as shown, and passes through a light rotator 87 operating according to laws discovered by Michael Faraday. Beam splitter 83 does not change the polarization of the light and so the beam enters the rotator polarized in a plane at 45 degrees to the plane of the drawing. Rotator 87 is so constructed as to rotate the light beam 45 degrees in a direction such that its plane of polarization at the output end is perpendicular to the plane of the drawing. This beam is then passed through a vertical deflection unit 88 and a horizontal deflection unit 89 like the units 76 and 77 of FIG. 6. Adjacent the unit 89 is a screen 90 having characters formed of a material which reflects the light in the form of the characters back through the deflection units and the light rotator 87. This rotator again rotates the beam 45 degrees in the same direction it rotated the beam when passing in the opposite direction. The beam then enters the beam splitter 83 polarized in a plane spaced angularly 90 degrees from the plane in which the light was received from the source 82. With the light polarized in this plane, it passes straight through the beam splitter to a plate 92 of optically active material, such as quartz, which rotates the beam 45 degrees in a direction opposite to that in which it was rotated by the rotator 87. The light, now polarized in a plane perpendicular to the plane of the drawings, is passed through a lens 93 which sharpens the outline of the character shaped beam and at the same time inverts the character. This beam is passed through vertical and horizontal deflection units 94, 95 and a lens 96 to the surface of the *display or* light sensitive medium 7. The lens 96 inverts and magnifies the character so it appears on the medium 7 enlarged and in true form. Deflection units 94 and 95 operate in the same manner as described above for locating each character in any desired location on the medium 7. If desired, lenses may be employed in a similar manner for sharpening and magnifying characters in the earlier forms of the invention.

Figure 8:
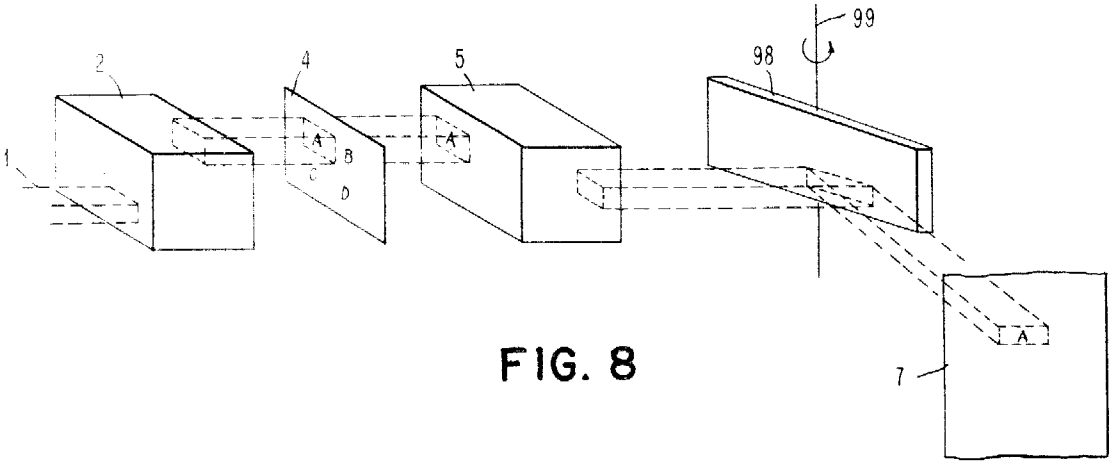
FIG. 8 shows a system like FIG. 1 except that the positioning of characters in a printed line is accomplished by a rotatable mirror.

FIG. 8 shows an arrangement like FIG. 1 except that the light beam is directed from the second deflector 5 against a rotatable mirror 98 which reflects the beam against the surface of the *display or* light sensitive medium 7. The locating of a character at any selected position on a horizontal line is accomplished by rotating the mirror about a vertical axis 99 and operating an electro-optic shutter (not shown) at the appropriate time. With this arrangement, some means would be needed for shifting the medium 7 vertically to effect *display or* printing on different lines.

While this invention has been particularly shown and described with reference to preferred embodiments thereof, it will be understood by those skilled in the art that the foregoing and other changes in form and details may be made therein without departing from the spirit and scope of the invention.

What is claimed is:

1. An electro-optic printer comprising, in combination, means for providing a beam of collimated, plane polarized light, means for forming said beam, at points spaced laterally of each other, into the shape of any desired character, means including electro-optic devices for deflecting any character-shaped beam to a common path, a sheet of light sensitive material arranged perpendicular to said predetermined path, and means for directing said character-shaped light beam from said common path to the surface of said light sensitive material.

2. The printer of claim 1 in which said last-mentioned means includes electro-optic devices operable to effect a deflection of said character-shaped light beam from said common path to any desired point on the surface of said light sensitive medium.

3. An electro-optic printer comprising, in combination, a mask having transparent portions in the form of characters to be printed, means for producing a beam of linearly polarized light, means including electro-optic devices for deflecting said light beam selectively onto any one of said transparent portions whereby light is passed through said mask in the shape of the character formed by said portion, means for deflecting said character-shaped light beam passed through said mask to a predetermined path, a sheet of light sensitive material arranged perpendicular to said predetermined path, and means including electro-optic devices for deflecting said character-shaped light beam from said predetermined path selectively to any one of a plurality of locations on said light sensitive material.

4. An electro-optic printer comprising, in combination, means for producing a beam of linearly polarized light, a mask having transparent portions in the form of characters, means for deflecting said light beam selectively onto any one of said portions whereby light is passed through said masks in the shape of the character formed by said portion, said deflecting means including birefringent elements and an electro-optic device arranged at the input side of each element, said light beam passing through each of said elements in one or another of two paths depending on the plane of light polarization, said electro-optic devices either having no effect on the light beam or operating when energized to rotate the plane of polarization by 90 degrees, means for deflecting said character-shaped light beam from any point on said mask to a common path, a sheet of light sensitive material arranged perpendicular to said common path, and means for deflecting a light beam from said common path to any desired point on said light sensitive material.

5. The printer of claim 4 in which said means for deflecting said character-shaped beam to a common path comprises birefringent elements corresponding to said elements deflecting said beam to said character portions but arranged to deflect said character-shaped beam in directions opposite to the deflections by said last-mentioned elements, electro-optic devices arranged at the output sides of said birefringent elements controlling said character-shaped beam, and means for subjecting any one of said last-mentioned electro-optic devices and the electro-optic device for the corresponding element deflecting said beam to a character portion, simultaneously to an operating potential.

6. An electro-optic printer comprising, in combination, birefringent elements through which a beam of linearly polarized light passes over one or another of two paths depending on the plane of polarization, an electro-optic device arranged at one side of each of said elements and operable either to pass the light as received or to rotate its plane of polarization by 90 degrees, a beam splitter operable to deflect a beam of light polarized in one plane and to pass a beam of light without deflection when the plane of polarization is rotated 90 degrees, a light rotator arranged to receive light from said beam splitter and to pass it on to one of said electro-optic devices, said light rotator operating to rotate by 45 degrees the plane of polarization of the light passing through it in either direction, said beam splitter being so arranged that the plane of polarization of light from it, after rotation of 45 degrees by said rotator, is in a plane to pass over one of said paths through said birefringent elements, a member having light reflecting portions in the shape of characters located in paths through which light may pass from said birefringent element, said portions acting when light is directed thereon to reflect it in character shapes back through said birefringent elements and said light rotator to said beam splitter, said light rotator rotating the plane of polarization another 45 degrees so the light reflected back to said beam splitter is polarized in a plane spaced 90 degrees from the plane in which the light originally passed said beam splitter and is directed through the latter in a different path, a second light rotator arranged to receive light passing in said different path and to rotate its plane of polarization 45 degrees in a direction opposite to the rotation by said first light rotator, a light sensitive medium arranged perpendicular to the path of light through said second rotator, and means for deflecting light from said second rotator to selected points on said medium.

7. A mechanism for effecting printing by means of a light beam comprising, in combination, a member having light reflecting portions in the shapes of different characters, a beam splitter for directing a plane polarized light beam toward said member, means for deflecting said beam selectively to said reflecting portions, said portions reflecting said beam back through said deflecting means to said beam splitter, means arranged between said deflecting means and said beam splitter for rotating the plane of polarization of said light by 90 degrees so it passes through said beam splitter by a different path, a light sensitive medium, and means for deflecting light from said different path to selected locations on said light sensitive medium.

8. A mechanism for producing a collimated and plane polarized light beam in the shape of different characters and directing it on a light sensitive medium for effecting printing comprising, in combination, a laser including a negative temperature medium, a member arranged at one end of said medium and having character-shaped mirrors for fully reflecting light directed thereon, means arranged between said medium and said mirrors for deflecting a light beam selectively to the latter, a partially reflecting mirror arranged at the opposite end of said medium, said partially reflecting mirror permitting a portion of any light impinging upon it to pass through, a light sensitive medium, and means for deflecting light passing said partially reflecting mirror to selected locations on said light sensitive medium.

9. The mechanism of claim 8 in which said means for deflecting light between said negative temperature medium and said character-shaped mirrors comprises birefringent elements, and an electro-optic device located adjacent the side of each of said elements toward said negative temperature medium.

10. A mechanism for producing a light beam in different shapes representative of bits of information comprising, in combination, a laser including a negative temperature medium, a member arranged at one end of said medium and having fully reflecting mirrors in shapes representative of bits of information, means for deflecting light selectively over different paths between said medium and said mirrors, and a mirror arranged at the opposite end of said medium reflecting a portion of the light impinging upon it and permitting the remainder to pass through.

11. An electro-optic printer comprising, in combination, means for providing a beam of collimated, plane polarized light in a given path, means for deflecting said light beam selectively to any one of a plurality of locations and returning said light beam to a common path in alignment with said given path, means at said locations for forming said light beam into the shapes of different characters, a sheet of light sensitive material arranged perpendicular to said common path, and means for deflecting said character shaped beam from said common path to selected locations on said light sensitive material.

12. The printer of claim 11 in which said light deflecting means comprises a plurality of birefringent elements varying in thickness by a factor of two, said elements operating to pass light polarized in one plane over one path as an ordinary ray and to pass light polarized in a plane at 90 degrees to said one plane over a different path as an extraordinary ray, and an electro-optic device at one side of each of said elements for rotating the plane of polarization of the light beam passing therethrough by 90 degrees.

*13. Electro-optic apparatus, comprising*

*means for providing a beam of collimated plane polarized light,*

*means for forming said beam at points spaced laterally of each other into the shape of any desired character,*

*means including electro-optic devices for deflecting any character-shaped beam to a common path,*

*a read-out medium disposed in the path, and*

*means for directing the character-shaped beam from the common path to the read-out medium for providing a manifestation of the desired character.*

*14. An electro-optic display, comprising*

*means for providing a beam of collimated plane polarized light,*

*means for forming said beam at points spaced laterally of each other into the shape of any desired character,*

*means including electro-optic devices for deflecting any character-shaped beam to a common path,*

*a display medium positioned perpendicularly to said path, and*

*means for directing the character-shaped light beam from the common path to the surface of the display medium.*

*15. The display of claim 14, wherein the last-named means comprises electro-optic devices operable to effect a deflection of the character-shaped light beam from the common path to any desired point on the surface of the display medium.*

References Cited by the Examiner

The following references, cited by the Examiner, are of record in the patented file of this patent or the original patent.

UNITED STATES PATENTS

| | | | |
|---|---|---|---|
| 1,923,891 | 8/1933 | Skaupy | 178—7.6 |
| 2,262,524 | 11/1941 | Ball | 88—24 |
| 2,531,951 | 11/1950 | Shamos et al. | 250—199 |
| 2,600,962 | 6/1952 | Billings | 88—65 |
| 2,788,707 | 4/1957 | Land | 88—24 |
| 2,887,935 | 5/1959 | Scott et al. | 95—4.5 |
| 2,909,972 | 10/1959 | De Lano | 95—4.5 |
| 2,931,027 | 3/1960 | Blefary et al. | 340—378 |
| 2,983,786 | 5/1961 | Rogers | 178—7.3 |
| 3,067,413 | 12/1962 | Fischle | 340—334 |
| 3,074,328 | 1/1963 | Rossetto et al. | 95—4.5 |

RICHARD B. WILKINSON, *Primary Examiner.*

STEPHEN J. TOMSKY, J. W. HARTARY, *Assistant Examiners.*